US012588654B2

(12) United States Patent
Daly et al.

(10) Patent No.: US 12,588,654 B2
(45) Date of Patent: *Mar. 31, 2026

(54) METHOD AND APPARATUS FOR OPERATING A ROTARY MILKING PLATFORM TO MAXIMISE THE NUMBER OF ANIMALS MILKED PER UNIT TIME AND A ROTARY MILKING PLATFORM

(71) Applicant: DAIRYMASTER, Kerry (IE)

(72) Inventors: John Gerard Daly, Kerry (IE);
Edmond Patrick Harty, Jr., Kerry
(IE); Shane Joseph Burns, County
Sligo (IE)

(73) Assignee: DAIRYMASTER, County Kerry (IE)

( * ) Notice: Subject to any disclaimer, the term of this
patent is extended or adjusted under 35
U.S.C. 154(b) by 419 days.

This patent is subject to a terminal dis-
claimer.

(21) Appl. No.: 18/363,264

(22) Filed: Aug. 1, 2023

(65) Prior Publication Data

US 2023/0371463 A1 Nov. 23, 2023

Related U.S. Application Data

(63) Continuation of application No. 17/263,015, filed as
application No. PCT/IE2019/000009 on Jul. 29,
2019, now Pat. No. 11,758,876.

(30) Foreign Application Priority Data

Jul. 27, 2018 (IE) .................................... 2018/0223

(51) Int. Cl.
*A01K 1/12* (2006.01)
(52) U.S. Cl.
CPC .................................... *A01K 1/126* (2013.01)
(58) Field of Classification Search
CPC ............ A01K 1/126; A01K 1/12; A01J 5/007
See application file for complete search history.

(56) References Cited

U.S. PATENT DOCUMENTS 6,050,219 A * 4/2000 van der Lely ........... A01K 1/12
119/14.08
6,883,461 B2 * 4/2005 Christensen ........... A01K 1/126
119/14.08

(Continued)

FOREIGN PATENT DOCUMENTS

CN 106572646 A 4/2017
EP 830 055 B1 6/2002

(Continued)

OTHER PUBLICATIONS

Written Opinion issued in PCT/IE2019/000009 issued on Oct. 24,
2019.

(Continued)

*Primary Examiner* — Yongjia Pan
(74) *Attorney, Agent, or Firm* — Sughrue Mion, PLLC

(57) ABSTRACT

A method and apparatus (3) for operating a rotary milking
platform (1) to maximise the number of animals milked per
unit time. The milking platform (1) is rotated about a central
vertical axis (4) by a variable speed motor (6), and com-
prises a plurality of animal accommodating locations (5) for
the animals being milked. An entry position (7) and an exit
position (9) accommodate animals to and from the platform
(1). A position sensor (10) monitors the angular position of
the platform (1). An RFID sensor (12) reads the identity of
animals entering the platform (1). Historical data relating to
milking time per milking session and the milk yield per
animal per session is stored in an electronic memory (17). A
microprocessor (15) reads signals from flow meters (14)
which monitor the milk flow from milking clusters of each
animal accommodating location (5). The microprocessor
(15) is configured as each animal enters the platform (1) to
compute an optimum angular velocity for the platform (1) in
order to maximise the number of animals milked per unit
time. The optimum angular velocity is computed as a (Continued)

function of the historical data of each animal on the platform (1), and the current milk yield of each animal on the milking platform (1) determined from the flow meter (14).

20 Claims, 1 Drawing Sheet

(56)                References Cited

U.S. PATENT DOCUMENTS

| 7,370,604 | B2 * | 5/2008 | Van Den Berg | ....... | A01K 1/126 119/14.02 |
| 8,286,584 | B2 * | 10/2012 | Lindstrom | ............. | A01K 1/126 119/14.02 |
| 2003/0150389 | A1 | 8/2003 | Christensen | | |
| 2005/0166851 | A1 | 8/2005 | Holscher et al. | | |
| 2010/0307420 | A1 | 12/2010 | Axelsson et al. | | |
| 2011/0308465 | A1 | 12/2011 | Siddell | | |
| 2011/0308467 | A1 | 12/2011 | Eckhardt | | |
| 2012/0210938 | A1 | 8/2012 | Hofman et al. | | |
| 2013/0167775 | A1 | 7/2013 | Van De Walle | | |

FOREIGN PATENT DOCUMENTS

| RU | 605 780 | C2 | 12/2016 | | |
| RU | 2605780 | C2 * | 12/2016 | ............. | A01J 5/007 |
| SU | 546327 | A1 | 7/1973 | | |
| SU | 1493188 | A1 | 7/1989 | | |
| WO | 98/53671 | A2 | 12/1998 | | |
| WO | 02/19806 | A1 | 3/2002 | | |
| WO | 2014070087 | A1 | 5/2014 | | |

OTHER PUBLICATIONS

International Search Report issued in PCT/IE2019/000009 on Oct. 24, 2019.

* cited by examiner

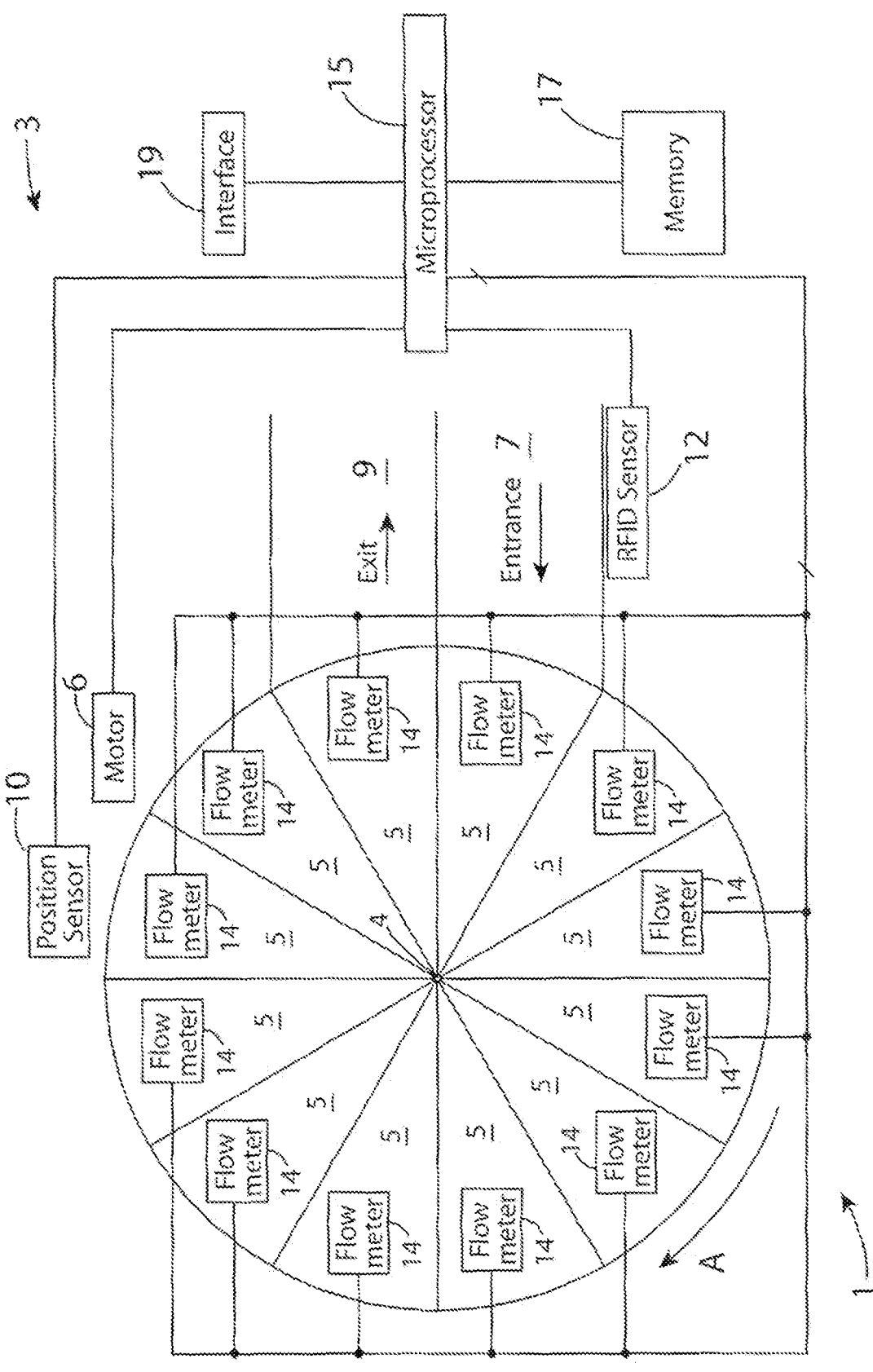

METHOD AND APPARATUS FOR OPERATING A ROTARY MILKING PLATFORM TO MAXIMISE THE NUMBER OF ANIMALS MILKED PER UNIT TIME AND A ROTARY MILKING PLATFORM

This application is a Continuation Application of U.S. application Ser. No. 17/263,015 filed Jan. 25, 2021, which is a National Stage of International Application No. PCT/IE2019/000009 filed on Jul. 29, 2019, claiming priority based on Irish Patent Application No. S2018/0223 filed on Jul. 27, 2018.

The present invention relates to a method for operating a rotary milking platform to maximise the number of animals milked per unit time, and the invention also relates to an apparatus for controlling operation of a rotary milking platform to maximise the number of animals milked per unit time. Additionally, the invention relates to a rotary milking platform.

Rotary milking platforms provide a continuous process format to the milking operation for milking of cows and other animals, with an animal to be milked entering on the platform, and a corresponding animal having been milked leaving the platform at a certain frequency corresponding to the speed of the rotary platform. Typical rotational speeds of such milking platforms lie in the range of one revolution every six minutes to fifteen minutes, and depending on the number of animal accommodating locations on the platform, an animal enters the platform at an entry position and an animal leaves at an exit position at a frequency of one every eight seconds to thirty seconds. The entry position, being the position at which each animal enters the milking platform, and the exit position, being the position from which each animal leaves the milking platform. In general, the number of positions through which each animal accommodating location, and in turn an animal on an animal accommodating location, is moved between and including the entry position and the exit position is equal to the number of animal accommodating locations on the milking platform, provided that the entry position and the exit position to and from the platform are side by side. Although, in some rotary milking platforms up to three positions of the platform are allowed for each animal to exit the milking platform, in order to allow sufficient time for the animal to reverse out of the corresponding animal accommodating location.

During one platform revolution, each animal is pre-treated, which may include an examination of the teats of the animal, cleaning of the teats, and fore-milk from the animal may also be inspected. The teat cups of the milking cluster are then attached to the teats of the animal. On completion of milking, the milking cluster is removed from the teats of the animal and finally a post milking treatment may be applied before the animal leaves the platform. Pre-treatment, attaching of the milking cluster, detaching of the milking cluster and post treatment are usually consistent for a given milking parlour or operator, and are constant for each animal, unless further investigation or treatment resulting, for example, from an injury or an infection is required. While on the other hand the actual milking time for the animals may vary greatly between individual animals. Indeed, in some instances where further treatment or investigation is required, it may be necessary to stop the milking platform until the appropriate action has been taken.

The total milking time is dependent on the angular velocity of the rotary platform, which can be adjusted by the operator to be faster or slower. If an operator sets the angular velocity of the milking platform too fast, some of the animals will not be fully milked out in one revolution of the platform, and will travel around the milking platform for a second revolution thereof. If these animals finish milking just after the exit from the milking platform, then no further milk will be harvested from that animal accommodating location of the platform for the remainder of the revolution of the milking platform. If the operator sets the angular velocity of the platform too slow, the overall milking time will increase, and some animals may finish milking much earlier than the time it takes the milking platform to complete one revolution. This, also reduces the utilisation of each animal accommodating location on the milking platform. However, it is not possible for an operator to easily determine the value of the angular velocity at which the milking platform should be set which will result in the minimum overall time to milk all the animals in a herd.

There is therefore a need for a method for controlling a rotary milking platform in order to maximise the number of animals milked per unit time, and there is also a need for an apparatus for controlling the operation of a rotary milking platform in order to maximise the number of animals milked per unit time on the milking platform.

The present invention is directed towards providing such a method and an apparatus, and the invention is also directed towards providing a rotary milking platform.

According to the invention a method for operating a rotary milking platform to maximise the number of animals milked per unit time on the platform, the platform comprising a plurality of animal accommodating locations circumferentially arranged around the platform, and each animal accommodating location is configured to pass through P positions between and including an entry position at which the respective animal accommodating locations are sequentially entered by the animals, and an exit position from which the respective animal accommodating locations are sequentially exited by the animals during each revolution of the platform, the method comprising computing the optimum angular velocity of the platform to maximise the number of animals milked per unit time as a function of historical data of each one of the animals currently on the platform, the historical data comprising at least one of the historical milking time per milking session to milk each one of the animals currently on the platform, and the historical milk yield per milking session of each one of the animals currently on the platform.

In one embodiment of the invention the optimum angular velocity of the platform is computed as a function of the current angular velocity of the platform. Preferably, the optimum angular velocity is computed as a function of a plurality of respective different values of angular velocity of the platform.

In another embodiment of the invention the optimum angular velocity of the platform is computed as a function of the current position of each animal currently on the platform from a start position, being the position of the platform at which that animal entered the platform.

Preferably, the method further comprises computing a predicted finishing position for each animal currently on the platform, at which milking of that animal is predicted to be finished.

Advantageously, the predicted finishing position of each animal currently on the platform is computed as a function of the current position of that animal on the platform.

In one embodiment of the invention the predicted finishing position of each animal currently on the platform is computed as a function of the historical data of that animal.

In another embodiment of the invention the predicted finishing position of each animal currently on the platform is computed as a function of at least one of the historical milking time per milking session to milk that animal, and the historical milk yield per milking session of that animal.

In one embodiment of the invention the predicted finishing position of each animal currently on the platform is computed as a function of the milking time of a previous milking session of that animal on the platform.

Preferably, the predicted finishing position of each animal currently on the platform is computed as a function of the milking time of a previous milking session of that animal at a time of the day corresponding to the time of the day of the current milking session of that animal. Advantageously, the predicted finishing position of each animal currently on the platform is computed as a function of the current milk yield of that animal on the platform.

In one embodiment of the invention the predicted finishing position for each animal currently on the platform is computed as a function of a predicted finishing time at which milking of that animal is predicted to be finished.

In another embodiment of the invention the predicted finishing time for each animal currently on the platform is computed as a function of the current position of that animal on the platform. Preferably, the predicted finishing time for each animal currently on the platform is computed as a function of the historical data of that animal.

Advantageously, the predicted finishing time for each animal currently on the platform is computed as a function of at least one of the historical milking time per milking session to milk that animal and the historical milk yield per milking session of that animal.

In one embodiment of the invention the predicted finishing time for each animal currently on the platform is computed as a function of the milking time of that animal of a previous milking session of that animal on the platform.

In another embodiment of the invention the predicted finishing time for each animal currently on the platform is computed as a function of the milking time of a previous milking session of that animal at a time of the day corresponding to the time of the day of the current milking session of that animal.

In another embodiment of the invention the predicted finishing time for each animal currently on the platform is computed as a function of the current milk yield of that animal on the platform.

Preferably, the predicted finishing time for each animal currently on the platform is computed as a function of the time that that animal has been milking on the platform and the immediate previously computed predicted finishing time.

In one embodiment of the invention the predicted finishing time for each animal currently on the platform is computed as a function of the difference between the current predicted finishing time for that animal and the time that that animal has been milking on the platform. Preferably, the predicted finishing time for each animal currently on the platform is computed as a function of the current position of that animal on the platform and the product of the current angular velocity of the platform and the difference of the current predicted finishing time for that animal and the time that that animal has been milking on the platform.

In one embodiment of the invention the optimum angular velocity of the platform is computed as a function of the computed predicted finishing position of each animal currently on the platform.

In another embodiment of the invention the method further comprises computing a non-productive period for each animal currently on the platform being a period that that animal will remain on the platform from the predicted finishing position of that animal to the one of the exit position of the platform for that animal and an ideal finishing position for that animal.

Preferably, the non-productive period for each animal currently on the platform is computed as a function of the difference between the one of the exit position of the platform for that animal and the ideal finishing position for that animal, and the predicted finishing position of the platform for that animal.

Advantageously, the total value of the non-productive periods for the respective animals currently on the platform is computed. Ideally, the total value of the non-productive periods of the respective animals currently on the platform is computed by summing the non-productive periods of the respective animals currently on the platform.

Preferably, the optimum angular velocity of the platform is determined as the value of the angular velocity of the platform at which the total value of the sum of the non-productive periods of the respective animals currently on the platform is minimised.

In one embodiment of the invention a plurality of the total values of the sum of the non-productive periods of the respective animals currently on the platform are computed for respective different values of the angular velocity of the platform.

In one embodiment of the invention the respective computed total values of the sum of the non-productive periods of the respective animals currently on the platform for the respective different values of the angular velocity of the platform are compared with each other, and the value of the angular velocity which results in the minimum value of the computed total values of the non-productive periods of the respective animals currently on the platform is determined as the optimum angular velocity for the platform.

Preferably, the values of the total value of the sum of the non-productive periods for the respective animals currently on the platform are computed for each value of the angular velocity of the platform as a function of the sum of the current position of each animal on the platform and the product of that value of the angular velocity of the platform and the difference of the current predicted finishing time of that animal and the time that that animal has been milking on the platform.

In one embodiment of the invention the method further comprises computing the number of revolutions of the platform each animal currently on the platform should remain on the platform in order to minimise the total value of the sum of the non-productive periods of the respective animals on the platform. Preferably, the optimum angular velocity of the platform is computed as a function of the computed number of revolutions each animal should remain on the platform in order to minimise the total value of the sum of the non-productive periods of the respective animals on the platform.

In one embodiment of the invention milking of each animal currently on the platform is deemed to have commenced on one of the attachment of a milking cluster to the teats of that animal and the detection of milk flow from the milking cluster attached to that animal.

In another embodiment of the invention the optimum angular velocity of the platform is computed each time an animal enters the platform. Advantageously, the optimum angular velocity of the platform is computed each time an animal exits the platform.

In another embodiment of the invention the optimum angular velocity of the platform is computed each time milking of an animal on the platform commences.

In another embodiment of the invention the optimum angular velocity of the platform is computed each time a deviation in the milk yield of each animal on the platform from the historical milk yield of that animal is detected.

In a further embodiment of the invention the optimum angular velocity of the platform is computed each time a deviation in the milking time of each animal on the platform from the historical milking time of that animal is detected.

In another embodiment of the invention the optimum angular velocity of the platform is computed at predefined time intervals. Preferably, each predetermined time interval lies in the range of 0.5 seconds to 60 seconds. Advantageously, each predetermined time interval lies in the range of 20 seconds to 30 seconds. Ideally, each predetermined time interval is approximately 25 seconds.

In a further embodiment of the invention the optimum angular velocity of the platform is substantially continuously computed.

Preferably, the angular velocity of the platform is altered each time a value of the optimum angular velocity of the platform is computed, and the angular velocity of the platform is altered to the just computed value of the optimum angular velocity. Advantageously, the angular velocity of the platform is altered gradually, each time the angular velocity of the platform is being altered to the just computed value of the optimum angular velocity.

Preferably, the historical data of each animal on the platform is weighted to the historical data determined during an immediately preceding predefined time period. Advantageously, the predefined time period lies in the range of 1 day to 30 days. Preferably, the predefined time period lies in the range of 2 days to 7 days. Ideally, the predefined time period is approximately 5 days.

In one embodiment of the invention the historical data of each animal currently on the platform is weighted to data based on one of the immediate previous milking session of that animal on the platform.

In another embodiment of the invention the historical data of each animal currently on the platform is weighted to data based on the one of the immediate previous milking sessions at the time of the day corresponding to the time of the currently milking session of that animal. In a further embodiment of the invention the historical data of each animal on the platform includes data relating to at least one of the stage of lactation of that animal, and the time of the day (morning or evening) to which the historical data of that animal relates.

Preferably, the historical data of each animal to be milked on the platform is provided as a milking profile specific to that animal. Advantageously, the milking profile of each animal is derived from historical milking data of that animal acquired over a plurality of milking sessions of that animal. Preferably, the milking profile of each animal is determined by curve fitting a large number of statistical probability distributions and the best fit model is identified. Advantageously, the milking profile of each animal is determined from the best fit model.

The invention also provides a milking platform configured to operate under the control of the method according to the invention.

Additionally the invention provides a rotary milking platform configured to operate in accordance with the method according to the invention to maximise the number of animals milked per unit time on the platform.

Further the invention provides apparatus for operating a rotary milking platform to maximise the number of animals milked per unit time, the apparatus comprising a signal processor configured to carry out the method according to the invention and to compute the optimum angular velocity of the platform in accordance with the method to maximise the number of animals milked per unit time.

The invention also provides apparatus for operating a rotary milking platform to maximise the number of animals milked per unit time, the apparatus comprising a signal processor configured to compute the optimum angular velocity of the platform to maximise the number of animals milked per unit time as a function of historical data of each one of the animals currently on the platform, the historical data comprising at least one of the historical milking time per milking session to milk each one of the animals currently on the platform, and the historical milk yield per milking session of each one of the animals currently on the platform.

In one embodiment of the invention the signal processor is configured to compute the optimum angular velocity of the platform as a function of the current angular velocity of the platform. Preferably, the signal processor is configured to compute the optimum angular velocity as a function of a plurality of respective different values of angular velocity of the platform.

In one embodiment of the invention the signal processor is configured to compute the optimum angular velocity of the platform as a function of the current position of each animal currently on the platform from a start position, being the position of the platform at which that animal entered the platform.

In another embodiment of the invention the signal processor is configured to compute a predicted finishing position for each animal currently on the platform, at which milking of that animal is predicted to be finished.

In a further embodiment of the invention the signal processor is configured to compute the predicted finishing position of each animal currently on the platform as a function of the current position of that animal on the platform.

Preferably, the signal processor is configured to compute the predicted finishing position of each animal currently on the platform as a function of the historical data of that animal.

Advantageously, the signal processor is configured to compute the predicted finishing position of each animal currently on the platform as a function of at least one of the historical milking time per milking session to milk that animal, and the historical milk yield per milking session of that animal.

In another embodiment of the invention the signal processor is configured to compute the predicted finishing position of each animal currently on the platform as a function of the milking time of a previous milking session of that animal on the platform.

Preferably, the signal processor is configured to compute the predicted finishing position of each animal currently on the platform as a function of the milking time of a previous milking session of that animal at a time of the day corresponding to the time of the day of the current milking session of that animal.

In one embodiment of the invention the signal processor is configured to compute the predicted finishing position of each animal currently on the platform as a function of the current milk yield of that animal on the platform.

In another embodiment of the invention the signal processor is configured to compute the predicted finishing position for each animal currently on the platform as a function of a predicted finishing time at which milking of that animal is predicted to be finished.

In another embodiment of the invention the signal processor is configured to compute the predicted finishing time for each animal currently on the platform as a function of the current position of that animal on the platform.

Preferably, the signal processor is configured to compute the predicted finishing time for each animal currently on the platform as a function of the historical data of that animal.

Advantageously, the signal processor is configured to compute the predicted finishing time for each animal currently on the platform as a function of at least one of the historical milking time per milking session to milk that animal and the historical milk yield per milking session of that animal.

In another embodiment of the invention the signal processor is configured to compute the predicted finishing time for each animal currently on the platform as a function of the milking time of that animal of a previous milking session of that animal on the platform. Preferably, the signal processor is configured to compute the predicted finishing time for each animal currently on the platform as a function of the milking time of a previous milking session of that animal at a time of the day corresponding to the time of the day of the current milking session of that animal.

In another embodiment of the invention the signal processor is configured to compute the predicted finishing time for each animal currently on the platform as a function of the current milk yield of that animal on the platform.

Preferably, the signal processor is configured to compute the predicted finishing time for each animal currently on the platform as a function of the time that that animal has been milking on the platform and the immediate previously computed predicted finishing time.

In another embodiment of the invention the signal processor is configured to compute the predicted finishing time for each animal currently on the platform as a function of the difference between the current predicted finishing time for that animal and the time that that animal has been milking on the platform. Preferably, the signal processor is configured to compute the predicted finishing time for each animal currently on the platform as a function of the current position of that animal on the platform and the product of the current angular velocity of the platform and the difference of the current predicted finishing time for that animal and the time that that animal has been milking on the platform.

In one embodiment of the invention the signal processor is configured to compute the optimum angular velocity of the platform is computed as a function of the computed predicted finishing position of each animal currently on the platform.

In another embodiment of the invention the signal processor is configured to compute a non-productive period for each animal currently on the platform being a period that that animal will remain on the platform from the predicted finishing position of that animal to the one of the exit position of the platform for that animal and an ideal finishing position for that animal.

Preferably, the signal processor is configured to compute the non-productive period for each animal currently on the platform as a function of the difference between the one of the exit position of the platform for that animal and the ideal finishing position for that animal, and the predicted finishing position of the platform for that animal.

Preferably, the signal processor is configured to compute the total value of the non-productive periods for the respective animals currently on the platform. Advantageously, the signal processor is configured to compute the total value of the non-productive periods of the respective animals currently on the platform by summing the non-productive periods of the respective animals currently on the platform.

In one embodiment of the invention the signal processor is configured to determine the optimum angular velocity of the platform as the value of the angular velocity of the platform at which the total value of the sum of the non-productive periods of the respective animals currently on the platform is minimised.

Preferably, the signal processor is configured to compute a plurality of total values of the sum of the non-productive periods of the respective animals currently on the platform for different values of the angular velocity of the platform. Advantageously, the signal processor is configured to compare the respective computed total values of the sum of the non-productive periods of the respective animals currently on the platform for the different values of the angular velocity of the platform with each other, and to determine the value of the angular velocity which results in the minimum value of the computed total values of the non-productive periods of the respective animals currently on the platform as the optimum angular velocity for the platform.

Preferably, the signal processor is configured to compute the values of the total value of the sum of the non-productive periods for the respective animals currently on the platform for each value of the angular velocity of the platform as a function of the sum of the current position of each animal on the platform and the product of that value of the angular velocity of the platform and the difference of the current predicted finishing time of that animal and the time that that animal has been milking on the platform.

In one embodiment of the invention the signal processor is configured to compute the number of revolutions of the platform each animal currently on the platform should remain on the platform in order to minimise the total value of the sum of the non-productive periods of the respective animals on the platform. Advantageously, the signal processor is configured to compute the optimum angular velocity of the platform as a function of the computed number of revolutions each animal should remain on the platform in order to minimise the total value of the sum of the non-productive periods of the respective animals on the platform.

In another embodiment of the invention the signal processor is configured to deem milking of each animal currently on the platform to have commenced on one of the attachment of a milking cluster to the teats of that animal and the detection of milk flow from the milking cluster attached to that animal.

Preferably, the signal processor is configured to compute the optimum angular velocity of the platform each time an animal enters the platform. Advantageously, the signal processor is configured to compute the optimum angular velocity of the platform each time an animal exits the platform.

In one embodiment of the invention the signal processor is configured to compute the optimum angular velocity of the platform each time milking of an animal on the platform commences.

In another embodiment of the invention the signal processor is configured to compute the optimum angular velocity of the platform each time a deviation in the milk yield of each animal on the platform from the historical milk yield of that animal is detected.

In a further embodiment of the invention the signal processor is configured to compute the optimum angular velocity of the platform each time a deviation in the milking time of each animal on the platform from the historical milking time of that animal is detected.

In one embodiment of the invention the signal processor is configured to compute the optimum angular velocity of the platform at predefined time intervals.

In a further embodiment of the invention the signal processor is configured to compute the optimum angular velocity of the platform substantially continuously.

In another embodiment of the invention the signal processor is configured to alter the angular velocity of the platform each time a value of the optimum angular velocity of the platform is computed, and to alter the angular velocity of the platform to the just computed value of the optimum angular velocity.

Preferably, the signal processor is configured to alter the angular velocity of the platform gradually, each time the angular velocity of the platform is being altered to the just computed value of the optimum angular velocity.

In another embodiment of the invention the signal processor is configured to weight the historical data of each animal on the platform to the historical data determined during an immediately preceding predefined time period.

Preferably, the signal processor is configured to weight the historical data of each animal currently on the platform to the historical data based on one of the immediate previous milking session of that animal on the platform.

Advantageously, the signal processor is configured to weight the historical data of each animal currently on the platform to the historical data based on the one of the immediate previous milking sessions at the time of the day corresponding to the time of the currently milking session of that animal.

Preferably, the historical data of each animal on the platform includes data relating to at least one of the stage of lactation of that animal, and the time of the day (morning or evening) to which the historical data of that animal relates.

The invention also provides a rotary milking platform comprising the apparatus according to the invention for controlling the operation of the platform to maximise the number of animals milked per unit time.

The advantages of the invention are many. A particularly important advantage of the invention is that the method and apparatus according to the invention permits the number of animals milked per unit time on the milking platform to be maximised. This is achieved by virtue of the fact that the angular velocity of the platform is regularly updated to an optimum angular velocity which maximises the number of animals milked per unit time based on the animals currently on the platform. By computing an optimum angular velocity for the platform each time an animal enters the platform, the number of animals milked per unit time is maximised.

By maximising the number of animals milked per unit time on the platform, the total milking time to milk a given herd size can be significantly reduced. Thus, in the case of relatively large herds, the size and number of milking platforms may be reduced, which is also a significant advantage.

The invention will be more clearly understood from the following description of a preferred embodiment thereof which is given by way of a non-limiting example only with reference to the accompanying drawing in which:

FIG. 1 is a block representation of a rotary milking platform according to the invention and apparatus also according to the invention for carrying out a method also according to the invention for operating the rotary milking platform to maximise the number of animals milked on the platform.

Referring to the drawing there is illustrated a rotary milking platform according to the invention indicative generally by the reference numeral 1. The rotary milking platform 1 comprises apparatus also according to the invention indicated generally by the reference numeral 3 for carrying out a method according to the invention for operating the rotary milking platform 1 in order to maximise the number of animals milked per unit time, in this case the number of animals milked per hour. The rotary milking platform 1 is rotatably mounted about a vertical central main rotational axis 4, and comprises a plurality of animal accommodating locations 5 for accommodating respective animals on the platform 1 during milking thereof. Any number of animal accommodating locations 5 may be provided, however, typically the number of animal accommodating locations may range from twenty to one hundred and twenty, and even higher. In this embodiment of the invention, for convenience the platform 1 is illustrated as comprising twelve animal accommodating locations 5. A variable speed motor 6 which is illustrated in block representation only, rotates the platform about the main rotational axis 4 in the direction of the arrow A.

An entrance 7 is provided to the milking platform 1 through which animals enter the animal accommodating locations 5 sequentially as the platform 1 rotates about the main rotational axis 4 in the direction of the arrow A past the entrance 7. The entrance 7 will also be referred to herein as the entry position 7. An exit 9 is provided from the platform 1 for accommodating animals sequentially from the animal accommodating locations 5 as the platform 1 rotates in the direction of the arrow A past the exit 9. The exit 9 will also be referred to herein as the exit position 9. In this embodiment of the invention, and in general in such rotary milking platforms, the exit 9 is located adjacent the entrance 7, so that the number P of positions through which each animal accommodating location 5, and in turn each animal on one of the animal accommodating locations 5 passes between and including the entry position 7 and the exit position 9 on each revolution of the platform 1 is equal to the number of animal accommodating locations on the platform 1, assuming that the angular width of each position is equal to the angular width of each of the animal accommodating locations 5. However, in general, in order to more easily allow the animals to exit the platform through the exit 9, since the animals must reverse from the respective animal accommodating locations, the exit 9 may be wider than the entrance 7, and typically, may be as wide as three animal accommodating locations.

A position sensor 10 which is illustrated in block representation, continuously monitors the rotation of the platform 1 and produces signals indicative of the position of the platform 1 relative to a datum, in this embodiment of the invention the entry position 7.

A means for identifying each animal as it passes through the entrance 7 onto the platform 1, in this embodiment of the invention comprises an RFID sensor element 12 which is located adjacent the entrance 7 to the animal accommodating locations 5 of the platform 1. Each animal of a herd of animals to be milked on the rotary milking platform 1 is provided with a suitable identifying tag, which in this embodiment of the invention comprises an ear tag. The ear tags are provided with respective electronically readable unique identity codes for identifying the respective animals. The RFID sensor element 12 reads the codes from the respective ear tags as the animals sequentially enter the animal accommodating locations 5 through the entrance 7.

Each animal accommodating location 5 is provided with a milking cluster (not shown) for attaching to the teats of an animal for milking thereof. The milk is drawn in conventional fashion from the milking clusters, and is delivered to a bulk milk storage tank (not shown). The milk from each milking cluster is drawn through a corresponding flow meter 14 illustrated in block representation for continuously monitoring the flow rate of milk being drawn from an animal on the corresponding animal accommodating location 5. The flow meters 14 produce electronic signals indicative of the monitored flow rate of the milk from the respective animals in the respective animal accommodating locations 5.

The milking platform 1 described thus far, will be known to those skilled in the art, and further detailed description of the rotary milking platform 1 should not be required.

Turning now to the apparatus 3 for carrying out the method according to the invention for operating the rotary milking platform 1 in order to maximise the number of animals milked per hour, the apparatus 3 comprises a signal processor, which in this embodiment of the invention is provided by a microprocessor 15. The microprocessor 15 is programmed to control the operation of the rotary milking platform 1 and to control the motor 6 and the speed thereof, for in turn, controlling the angular velocity of the platform 1, so that the platform 1 is rotated about the main rotational axis 4 at an optimum angular velocity for maximising the number of animal milked per hour on the platform 1 as will be described below.

The microprocessor 15 reads signals from the RFID sensor 12 for identifying each animal as the animal enters an animal accommodating location 5 on the platform 1. The microprocessor 15 is programmed to cross-reference the identity of each animal with the identity of the animal accommodating location on which that animal is located. The identity of each animal cross-referenced with the identity of the animal accommodating location on which the animal is located is stored in memory, which may be a memory of the microprocessor 15 or an electronic memory 17 with which the microprocessor 15 is in communication. For the purpose of the description of this embodiment of the invention, it is assumed that the identity of each animal cross-referenced with the corresponding animal accommodating location 5 is stored in the memory 17.

The microprocessor 15 is also programmed to read signals from the flow meters 14 of the respective animal accommodating locations 5 and to compute the milk yield from each animal from the commencement of milking of that animal. The milk yields of the respective animals on the platform 1 are constantly updated and stored cross-referenced with the identity of the animal in the memory 17.

The microprocessor 15 is also programmed to continuously read signals from the position sensor 10. The microprocessor 15 is programmed to determine from signals read from the position sensor 10, the current angular position of each animal on the platform 1, which is the angular distance through which the platform 1 has rotated since that animal entered the platform 1. The current angular position of each animal on the platform 1 is the same as the current angular position of the animal accommodating location on which that animal is located, and therefore the current angular position of that animal on the platform 1 is equal to the angle through which the animal accommodating location 5 on which that animal is located has travelled since that animal entered that animal accommodating location 5. For convenience the position of each animal accommodating location 5 when an animal enters that animal accommodating location 5 at the entrance 7 is referred to as the start position of that animal accommodating location, and in turn of that animal. Accordingly, the microprocessor 15 determines from signals read from the position sensor 10, the start position of each animal accommodating location 5, from the angular position of the platform 1 when that animal accommodating location 5 is aligned with the entrance 9. The microprocessor 15 determines the current angular position of each animal accommodating location 5, and in turn the current angular position of each animal on the platform 1 by summing the angular distance travelled by that animal accommodating location 5 to the angular position of the platform 1 when that animal accommodating location 5 was in the start position. The current angular position of each animal and the corresponding animal accommodating location 5 from the corresponding start position is constantly updated, and stored in the memory 17 and cross-referenced with the identity of the corresponding animal.

The microprocessor 15 is also programmed to determine from signals read from the position sensor 10 and from the flow meters 14, the angular position of each animal on the platform 1 when milking of that animal commences. The microprocessor 15 is programmed to determine the commencement of milking of an animal on the signals read from the flow meter 14 corresponding to the animal accommodating location 5, on which that animal is located, being indicative of the commencement of milk flow. On the microprocessor 15 determining the commencement of milking of that animal, the microprocessor 15 determines the angular position of that animal on the platform 1 on the commencement of milking thereof by determining the angular position of the animal accommodating location 5 on which that animal is located from the start position thereof. The microprocessor 15 stores the angular position at the commencement of milking of each animal in the memory 17 cross-referenced with the identity of the corresponding animal.

The microprocessor 15 is programmed to compute the optimum angular velocity of the platform 1 for maximising the number of animals milked per hour on the platform 1 based on historical data relating to each animal on the platform. The historical data for each of the animals of a herd of animals to be milked on the platform 1 is stored in the memory 17 and cross-referenced with the identity of the corresponding animal. In this embodiment of the invention the historical data is stored as a milking profile specific to each animal and comprises the historical milking time per milking session of each animal of the herd of animals, and the historical milk yield per milking session for each animal of the herd. The historical milking time per session of each animal and the historical milk yield per milking session of each animal is provided separately for each of the milking sessions in a day, for example, in cases where animals are milked twice a day, in the morning and in the evening, the historical milking time per session and the historical milk yield per milking session would be stored for each animal separately for the morning session and the evening session. If the animals were milked more than twice per day, this data would be provided separately for each of the three or more milking sessions per day. Additionally, the historical data includes the stage of lactation of each animal. The time of the last milking session when each animal was milked is also stored in the memory 17.

The historical data of the respective animals may be initially inputted manually to the microprocessor 15 and stored in the memory 17 through a suitable interface 19, which may comprise a keyboard, a touchscreen or the like. Alternatively, the interface 19 may comprise a suitable connection for connecting the microprocessor 15 to a computer for downloading the historical data from a computer to the memory 17. The historical data may additionally or alternatively be derived from a number of milking sessions of the respective animals of the herd on the milking platform 1. Once the historical data has been initially stored in the memory 17, the historical data is continuously updated for the respective animals after each milking session on the platform 1 based on the milking performances of the respective animals during that milking session. In order to enhance the accuracy with which the optimum angular velocity for the platform 1 is computed, the historical data of the respective animals is weighted to the more recent milking performance of the respective animals, and typically, the historical data of the respective animals is weighted to the milking performance of the respective animals during the previous three to seven days.

In this embodiment of the invention the microprocessor 15 is programmed to compute a new optimum angular velocity for the platform 1 each time an animal enters the platform 1, and on the new optimum angular velocity being computed, the microprocessor 15 controls the variable speed motor 6 to alter the angular velocity of the platform 1 to the just computed optimum angular velocity.

Before describing in detail how the optimum angular velocity for the platform is computed, a broad outline of the method for determining the optimum angular velocity of the platform 1 will first be described.

As each animal enters the platform 1, the microprocessor 15 identifies the animal from signals read from the RFID sensor element 12, and cross-references the identity of the animal with the number of the animal accommodating location 5 entered by that animal, so that that animal can be tracked during the milking thereof on the platform 1. The microprocessor 15 is programmed so that each time an animal enters the platform 1, the microprocessor 15 computes the optimum angular velocity of the platform 1, in order to maximise the number of animals milked per unit time, namely, milked per hour on the platform 1. Additionally, the microprocessor 15 is also programmed to compute the optimum angular velocity of the platform 1 in order to maximise the number of animals milked per hour on the platform as each animal exits the platform 1, and in particular where an animal exits the platform, and no animal enters the platform for that position of the platform which has just been vacated.

In order to determine the optimum angular velocity of the platform, the microprocessor 15 is programmed to initially compute a predicted finishing position for each animal on the platform 1, in other words, the angular position in radians of the animal accommodating location 5 of that animal at which the milking of that animal is predicted to be finished. The predicted finishing position for each animal is computed based on the current angular position of that animal on the platform 1 and on the historical data for that animal for the milking session of the day corresponding to the current milking time, and also based on the milk yield of that animal from the commencement of milking to the current angular position of that animal on the platform 1, and the time that that animal has been milking from the commencement of milking to the current angular position of that animal on the platform 1. On computing the predicted finishing position for each animal, the microprocessor 15 is programmed to then compute a non-productive period in radians for each animal on the platform 1 from the predicted finishing position to an ideal finishing position. The ideal finishing position of each animal is the angular position of the platform at which milking of that animal should be finished in order to allow sufficient time for removal of the milking cluster from the teats of that animal and for any post treatment for treating the teats of that animal before that animal reaches the exit position 9. The non-productive period for each animal is the period during which that animal would remain on the platform from the predicted finishing position to the ideal finishing position of that animal and during which no milk would be harvested from that animal. The non-productive period for each animal is computed by subtracting the angle of the predicted finishing position from the angle of the ideal finishing position, both based on the start position of the animal accommodating location 5 on which that animal is located. Initially, the predicted finishing positions for each animal is computed based on the current angular velocity of the platform. The computed predicted finishing position for some of the animals on the platform, will terminate before the ideal finishing position, and some may terminate after the ideal finishing position, and may extend beyond $2\pi$ radians from the start position for that animal, which would result in the animal having to remain on the platform 1 for a further revolution of the platform 1.

When the non-productive periods for each of the animals on the platform 1 have been computed, the non-productive periods in radians are summed to give a total value of the non-productive periods for the current angular velocity of the platform. The microprocessor 15 is programmed to then compute a plurality of total values of the sum of the non-productive periods for the animals on the platform for a plurality of different values of the angular velocity of the platform. The microprocessor 15 then compares the respective total values of the sum of the non-productive periods of the animals on the platform 1 for the different values of the angular velocity of the platform, and the value of the angular velocity of the platform which results in the minimum value of the total values of the sum of the non-productive periods for the animals on the platform is determined by the microprocessor 15 to be the optimum angular velocity.

On determining the optimum angular velocity for the platform 1, the microprocessor 15 then controls the speed of the motor 6 to gradually alter the angular velocity of the platform 1 to the just determined optimum angular velocity.

In general, it is desirable that based on the newly determined optimum angular velocity of the platform, the predicted finishing positions of the majority of the animals should occur just before the ideal finishing position. However, if the predicted finishing positions of some of the animals should occur after the ideal finishing position, then those animals with such predicted finishing positions will remain on the platform for a further revolution of the platform.

In general, depending on the number of animal accommodating locations on the platform, and the angular velocity of the platform, from the time an animal enters the platform through the entry position 7, in other words from the start position of that animal, until the milking cluster has been attached to that animal, the platform may have passed through three to eight positions of the platform. Thus, a number of the animals on the milking platform when the optimum angular velocity of the platform is being computed will not have commenced milking. In order that a predicted finishing position can be computed for each of those animals for which the milking clusters have not yet been attached, the milking clusters are assumed to be attached to those animals at a predefined angular position. Typically, the predefined position will be the position at which it is expected that the milking cluster would be attached to the animal, and which in turn would be the average position to which the milking clusters are normally attached to the animals. The predicted finishing position for each of those animals is computed based on that predefined position, which would also be deemed to be the position of the relevant animal on the platform at which milking of that animal will commence. However, once the signals read by the microprocessor 15 from the corresponding one of the flow meters 14 is indicative of the commencement of milking of that animal, the predicted finishing position for that animal is then computed on the angular position of the animal accommodating location 5 of that animal at which the commencement of milking of that animal occurred.

The method for determining the optimum angular velocity for the platform for which the microprocessor 15 is programmed to carry out will now be described in more detail. Initially an objective function is prepared which can be used in the computation of the optimum angular velocity of the platform by the microprocessor 15 in order to maximise the number of animals milked per unit time on the platform. There are two key steps involved in the overall system optimisation, statistical analysis of the historical data and the development of an optimisation algorithm based on the dynamics of the platform 1.

Initially the historical data for all of the animals in the herd is analysed to develop milking profiles specific to each animal. This data as discussed above includes the milk yield per milking session and the milking time per milking session for each animal of the herd over a number of milking sessions, for example, over a predefined period in the range of, for example, 1 to 30 days, and preferably, in the range of 2 to 7 days, and advantageously, a predefined period of approximately 5 days. The milking time per milking session for each animal and the milk yield per milking session for each animal is provided separately for the morning milking sessions and the evening milking sessions for each animal of the herd. Additionally, this historical data includes the stage of lactation of each animal of the herd. This data is then curve fitted using a large number of statistical probability distributions, and the best fit model is identified for each animal. The best fit is determined by evaluating the sum of squared errors of predictions (SSE) for each model. A predicted milk-out time, in other words, the predicted duration of the milking time for a milking session is determined for each animal from the model, and is used as an input to the optimisation model. The predicted milk-out time for each animal is constant for that animal, and is stored in the memory 17. However, during each milking session of each animal on the platform 1 a variable milk-out time is derived based on the current milk yield of that animal, and the milk-out time is continuously updated during each milking session. At the end of each milking session the final updated value of the milk-out time for each animal is stored and cross-referenced with that animal, and the milk-out time for each animal is weighted to the most recently updated value of the milk-out time.

On commencement of milking of each animal on the platform 1, the milk-out time of each animal is based on the milk-out time determined from the model weighted to the most recent updated value thereof. Once milking has commenced, the milk-out time of each animal on the platform is dynamically updated based on the current detected milk yield of that animal. This update is carried out by comparing the predicted milk flow profile with the current milk flow profile, and then the predicted milking time is adjusted accordingly.

Turning now to the computation of the optimum angular velocity of the platform 1, in an ideal situation, there would be no non-productive periods on the platform, a non-productive period being the period an animal must remain on the platform 1 after milking of that animal has finished. However, in general, this is not achievable. In order to minimise the number of non-productive periods, it may be desirable in the case of one or a few of the animals to set the optimum angular velocity of the platform 1 such that one or a few of the animals may not have been milked-out by the time that or those animals reach the ideal finishing positions for those animals, or the exit position 9, and in which case, that or those animals would be retained on the platform for a second revolution of the platform, and in extreme cases for a third or more revolutions of the platform until milking-out of that or those animals had been completed.

The algorithm that the microprocessor 15 uses in order to minimise the total value of the sum of the non-productive periods of the animals currently on the platform in terms of different values of the angular velocity of the platform is as follows:

$$\text{minimise } \omega \, f(x) = \sum_{i=1}^{n} [(\phi - x_1)] \text{mod} 2m_i \pi] \text{ subject to } \omega > 0 \tag{1}$$

Equation (1) can be approximated to $$\text{minimise } \omega \, f(x) = \sum_{i=1}^{n} [2m_i \pi + \phi - x_i] \text{ subject to } \omega > 0 \tag{2}$$

where:
$\omega$ is the angular velocity of the platform 1 in radians per second,
$\phi$ is the ideal angular finishing position in radians for the animals on the platform from the start position of the respective animals,
n is the number of animals on the platform 1 when the optimum angular velocity of the platform 1 is being computed,
$x_i$ is the predicted finishing position in radians of a given animal from the start position of that animal, and
$m_i$ is the number of revolutions for a given animal for a given angular velocity of the platform 1,
and where $m_i=0$ if the predicted angular finishing positon of a given animal is in the first revolution of the milking platform from the start position of that animal, and is incremented by 1 for all additional rotations $$m_i = \left| \frac{\phi - x_i - ((\phi - x_i) \text{mod} 2\pi)}{2\pi} \right| \tag{3}$$

and where
Or $$x_1 = \theta_1 + \omega(\tau_1 - t_1)$$
$$x_2 = \theta_2 + \omega(\tau_2 - t_2)$$
$$\vdots$$

-continued $$x_n = \theta_n + \omega(\tau_n - t_n)$$

$$x_i = \begin{cases} \theta_i + \omega(\tau_i - t_i), & \text{for } t_i < \tau_i, \text{ for } i = 1 \ldots n \\ \theta_i, & \text{for } t_i \geq \tau_i \end{cases},$$

where:

$\theta_i$ is the current angular position in radians of a given animal on the platform 1 from the start position for that animal, $\tau_i$ is the expected milking time of a given animal on the platform 1 taking into account the current milk yield of that animal, and $t_i$ is the time for which a given animal on the platform 1 has been milking.

Each time an optimum value for the angular velocity of the platform 1 is to be computed, the microprocessor 15 computes a plurality of total values of the sum of the non-productive periods of the animals currently on the platform 1 from equation (2) for a plurality of different values of the angular velocity of the platform 1, including the current value of the angular velocity of the platform 1. The microprocessor 15 then determines the optimum value of the angular velocity for the platform 1 as the value of the angular velocity which results in the minimum value of the total values of the sum of the non-productive periods of the animals on the platform 1.

On the optimum value for the angular velocity of the platform 1 being computed, the microprocessor 15 then operates the motor 6 to gradually alter the current angular velocity of the platform 1 to the newly computed optimum angular velocity, and so operation of the milking platform continues until all the animals of the herd have been milked.

On completion of each milking session, the historical data for the animals of the herd of animals, which is stored in the memory 17, and which comprises data defining the milking profiles specific to the respective animals of the herd, and which includes the historical milking time and milk yield per milking session for each animal of the herd, is updated with the milk yield and the milking time of the just completed milking session, with the historical milk yield and milking time per milking session for each animal being weighted by the respective updated values thereof.

While the embodiment of the invention has been described whereby the optimum angular velocity of the platform 1 is computed each time an animal enters the milking platform and/or exits the milking platform, it is envisaged that the optimum angular velocity of the platform 1 may be computed at any time during the rotation of the milking platform. For example, it is envisaged that the optimum angular velocity of the milking platform may be computed each time a milking cluster is attached to an animal, and/or each time a milking cluster is detached from an animal. It is also envisaged that the optimum angular velocity of the milking platform may be computed each time the milking rate of one or more of the animals has been found to diverge from the historical and/or predicted milking rate of one or more of the animals on the platform. Further, it is envisaged that the optimum angular velocity of the platform may be computed each time the milking platform has been restarted, having being stopped as a result of further action being required in connection with an animal in which the pre-treatment of the animal prior to attaching of the milking cluster to that animal indicated that further investigation or treatment of that animal was required, which necessitated stopping the milking platform. It is also envisaged that the optimum angular velocity of the platform may be computed at predefined time intervals, whereby the predefined time intervals may range from 0.5 seconds to 60 seconds.

In other embodiments of the invention it is envisaged that the optimum angular velocity of the platform may be computed less frequently than described, and in some embodiments of the invention, it is envisaged that rather than computing the optimum angular velocity of the platform each time an animal enters the platform, an optimum angular velocity for the platform could be determined for an entire group of animals, and in which case, the angular velocity of the platform would be held constant for that group, but could, for example, be changed for the next group of animals. It is envisaged that if one group of animals were a high yielding group of animals, the optimum angular velocity could be computed for that high yielding group of animals, while an optimum angular velocity of the platform would then be computed for another group of animals, which may be a low milk yielding group.

It is also envisaged that the microprocessor may be programmed to detect an abnormal milking cluster attachment rate at which the milking clusters are being attached to the animals. For example, if milking clusters are being attached to the animals at a rate of one milking cluster per 12 seconds, and there is a gap greater than 12 seconds between the attachment of the last milking cluster and the next milking cluster to be attached, the microprocessor 15 may be programmed to either slow down or stop the milking platform until the next milking cluster has been attached to the next animal to which a milking cluster is to be attached. Once that next milking cluster has been attached, then the microprocessor 15 would set the angular velocity of the milking platform at the angular velocity at which the platform had been rotating prior to the slowing down or stopping thereof, and the microprocessor would then compute a new optimum angular velocity for the platform, and then control the motor 6 to gradually alter the angular velocity of the platform 1 to the just computed optimum angular velocity.

In cases where animals are milking at a relatively fast rate, and the angular velocity of the platform is such that an operator cannot attach the milking clusters to the animals at a rate sufficiently fast to keep up with the rate at which the animals are entering the platform, it is envisaged that the microprocessor 15 may be programmed so that in the event of the attachment of a milking cluster to an animal being missed, the microprocessor 15 would either stop or control the speed of the motor 6 to reduce the angular velocity of the platform 1 to allow the operator sufficient time to attach the milking clusters to the animals at the rate at which the animals are entering the platform.

While the means for identifying each animal as it passes through the entrance onto the platform has been described as comprising an RFID sensor element, any other suitable animal identifying means may be used, for example, a video identifying means or any other suitable identifying means may be used. It is also envisaged that instead of, or as well as providing an animal identifying means adjacent the entrance onto the platform for identifying the animals as the animals enter the platform, suitable identifying means may be provided on the platform for identifying the respective animals on the platform in their respective animal accommodating locations. Such animal identifying means may be a single animal identifying means which would be configured to identify the animals in the respective animal accommodating locations, or suitable animal identifying means may be provided one in each animal accommodating location for identifying the animal in that animal accommodating location.

It is also envisaged that the historical data of each animal of the herd of animals may also include dietary data relating to each animal, for example, the milk yield per unit quantity of feed, and/or the milk yield per unit quantity of different types of feed. In which case, it is envisaged that a data collection system would be provided for collecting data relating to the current diet of the respective animals of the herd, and such a collecting system would collect data relating to the type of feed currently being consumed by each animal, the times of feeding of each animal and the amount of feed consumed by each animal per feed. The microprocessor would then be programmed when computing the predicted finishing position for each animal on the platform to take account of the type of feed recently consumed by each animal, the time of the last feed and the amount thereof consumed. In computing the predicted finishing position for each animal the microprocessor would modify the expected milk yield of that animal based on the type of feed recently consumed, the time of the feed and the amount thereof consumed by that animal. The microprocessor could also be programmed, for example, to take account of the type and consumption of feed consumed by each animal during the previous one to seven days, and more typically, the previous one to three days.

The invention claimed is:

1. A method for operating a rotary milking platform to maximise a number of animals milked per unit time on the platform, the platform comprising a plurality of animal accommodating locations circumferentially arranged around the platform, and each animal accommodating location is configured to pass through P positions between and including an entry position at which respective animal accommodating locations are sequentially entered by the animals, and an exit position from which the respective animal accommodating locations are sequentially exited by the animals during each revolution of the platform, the method comprising:

computing a predicted finishing position for each animal currently on the platform, at which milking of that animal is predicted to be finished, the predicted finishing position of each animal currently on the platform being computed as a function of historical data of that animal, the historical data of each animal currently on the platform comprising at least one of a historical milking time per milking session to milk that animal or a historical milk yield per milking session of that animal, computing a non-productive period for each animal currently on the platform being a period that animal will remain on the platform from the computed predicted finishing position of that animal to one of the exit position of the platform for that animal or an ideal finishing position for that animal, computing a number of revolutions of the platform each animal currently on the platform should remain on the platform in order to minimise a total value of a sum of the non-productive periods of the respective animals on the platform, and determining an optimum angular velocity of the platform as a function of the computed number of revolutions each animal should remain on the platform in order to minimise the total value of the sum of the non-productive periods of the respective animals on the platform.

2. A method as claimed in claim 1 wherein the predicted finishing position of each animal currently on the platform is computed as a function of a current position of that animal on the platform.

3. A method as claimed claim 1 wherein the predicted finishing position for each animal currently on the platform is computed as a function of a predicted finishing time at which milking of that animal is predicted to be finished.

4. A method as claimed in claim 3 wherein the predicted finishing time for each animal currently on the platform is computed as a function of time that that animal has been milking on the platform and an immediate previously computed predicted finishing time.

5. A method as claimed in claim 1 wherein the non-productive period for each animal currently on the platform is computed as a function of a difference between the one of the exit position of the platform for that animal and the ideal finishing position for that animal or the predicted finishing position of the platform for that animal.

6. A method as claimed in claim 1 wherein a total value of the non-productive periods for the respective animals currently on the platform is computed.

7. A method as claimed claim 1 wherein the optimum angular velocity of the platform is computed each time an animal enters the platform.

8. A method as claimed in claim 1 wherein the optimum angular velocity of the platform is computed each time an animal exits the platform.

9. A method as claimed in claim 1 wherein an angular velocity of the platform is altered each time a value of the optimum angular velocity of the platform is computed and the angular velocity of the platform is altered to the just computed value of the optimum angular velocity.

10. A method as claimed in claim 1 wherein the historical data of each animal on the platform is weighted to the historical data determined during an immediately preceding predefined time period.

11. Apparatus for operating a rotary milking platform to maximise a number of animals milked per unit time, the apparatus comprising a signal processor configured:

to compute a predicted finishing position for each animal currently on the platform, at which milking of that animal is predicted to be finished, the predicted finishing position of each animal currently on the platform being computed as a function of historical data of that animal, the historical data of each animal currently on the platform comprising at least one of a historical milking time per milking session to milk that animal or a historical milk yield per milking session of that animal, to compute a non-productive period for each animal currently on the platform being a period that animal will remain on the platform from the predicted finishing position of that animal to the one of an exit position of the platform for that animal or an ideal finishing position for that animal, to compute a number of revolutions of the platform each animal currently on the platform should remain on the platform in order to minimise a total value of a sum of the non-productive periods of respective animals on the platform, and to determine an optimum angular velocity of the platform as a function of the computed number of revolutions each animal should remain on the platform in order to minimise the total value of the sum of the non-productive periods of the respective animals on the platform.

12. Apparatus as claimed in claim 11 wherein the signal processor is configured to compute the predicted finishing position of each animal currently on the platform as a function of a current position of that animal on the platform.

13. Apparatus as claimed in claim 11 wherein the signal processor is configured to compute the predicted finishing position for each animal currently on the platform as a function of a predicted finishing time at which milking of that animal is predicted to be finished.

14. Apparatus as claimed in claim 13 wherein the signal processor is configured to compute the predicted finishing time for each animal currently on the platform as a function of the time that that animal has been milking on the platform and an immediate previously computed predicted finishing time.

15. Apparatus as claimed in claim 11 wherein the signal processor is configured to compute the non-productive period for each animal currently on the platform as a function of a difference between one of the exit position of the platform for that animal and the ideal finishing position for that animal or the predicted finishing position of the platform for that animal.

16. Apparatus as claimed in claim 11 wherein the signal processor is configured to compute a total value of the non-productive periods for the respective animals currently on the platform.

17. Apparatus as claimed in claim 11 wherein the signal processor is configured to compute the optimum angular velocity of the platform each time an animal enters the platform.

18. Apparatus as claimed in claim 11 wherein the signal processor is configured to compute the optimum angular velocity of the platform each time an animal exits the platform.

19. Apparatus as claimed in claim 11 wherein the signal processor is configured to alter an angular velocity of the platform each time a value of the optimum angular velocity of the platform is computed and to alter the angular velocity of the platform to the just computed value of the optimum angular velocity.

20. A rotary milking platform comprising the apparatus as claimed in claim 11 controlling an operation of the platform to maximise the number of animals milked per unit time.

* * * * *